(12) United States Patent
Gupta et al.

(10) Patent No.: US 12,298,833 B2
(45) Date of Patent: May 13, 2025

(54) PERFORMANCE LEVEL CONTROL IN A DATA PROCESSING APPARATUS

(71) Applicant: Intel Corporation, Santa Clara, CA (US)

(72) Inventors: Ujjwal Gupta, Chandler, AZ (US); Ankush Varma, Portland, OR (US); Lakshmipriya Seshan, Sunnyvale, CA (US); Nikethan Shivanand Baligar, Hillsboro, OR (US); Nikhil Gupta, Portland, OR (US); Swadesh Choudhary, Mountain View, CA (US); Yogesh Bansal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 18/007,627

(22) PCT Filed: Jun. 26, 2020

(86) PCT No.: PCT/US2020/039974
§ 371 (c)(1),
(2) Date: Dec. 1, 2022

(87) PCT Pub. No.: WO2021/262197
PCT Pub. Date: Dec. 30, 2021

(65) Prior Publication Data
US 2023/0236651 A1      Jul. 27, 2023

(51) Int. Cl.
*G06F 1/324*      (2019.01)
*G06F 1/10*      (2006.01)
(Continued)

(52) U.S. Cl.
CPC ............... *G06F 1/324* (2013.01); *G06F 1/10* (2013.01); *G06F 11/3409* (2013.01);
(Continued)

(58) Field of Classification Search
CPC ........ G06F 1/324; G06F 1/3203; G06F 13/00; G06F 15/16; G06F 1/10; G06F 11/3409
(Continued)

(56) References Cited

U.S. PATENT DOCUMENTS 7,945,804 B2 *   5/2011   Jacobowitz ............. G06F 1/324
                                                              709/200
9,429,983 B1 *   8/2016   Chall ........................ G06F 1/10
(Continued)

FOREIGN PATENT DOCUMENTS

JP      01-240963 A      9/1989
JP      05-334230 A     12/1993
(Continued)

OTHER PUBLICATIONS

Extended European Search Report issued Feb. 26, 2024 for EP Application No. 20941773.2, 7 pages.
(Continued)

*Primary Examiner* — Ji H Bae
(74) *Attorney, Agent, or Firm* — NICHOLSON DE VOS WEBSTER & ELLIOTT LLP

(57) ABSTRACT

A single communication fabric for a data processing apparatus is provided. The fabric has an interconnection network to provide a topology of data communication channels between a plurality of data-handling functional units. The interconnection network has a first interconnection domain to provide data communication between a first subset of the data-handling functional units and a second interconnection domain to provide data communication between a second subset of the data-handling functional units. The power management circuitry is arranged to control a first performance level for the first interconnection domain independently from control of a second performance level for the second interconnection domain. Machine readable instruc-
(Continued)

tions and a method are provided to concurrently set performance levels of two different fabric domains to respective different operating frequencies.

19 Claims, 10 Drawing Sheets

(51) Int. Cl.
    *G06F 1/3203*     (2019.01)
    *G06F 11/34*     (2006.01)
    *G06F 13/00*     (2006.01)
    *G06F 15/16*     (2006.01)

(52) U.S. Cl.
    CPC ............ *G06F 1/3203* (2013.01); *G06F 13/00* (2013.01); *G06F 15/16* (2013.01)

(58) Field of Classification Search
    USPC ............ 713/300, 322; 710/29, 100; 709/232
    See application file for complete search history.

(56) References Cited

U.S. PATENT DOCUMENTS

| | | | |
|---|---|---|---|
| 10,673,439 B1 | 6/2020 | Ahmad et al. | |
| 2006/0190755 A1* | 8/2006 | Kim ...................... | G06F 1/3243 |
| | | | 713/400 |
| 2007/0156370 A1 | 7/2007 | White et al. | |
| 2010/0174936 A1* | 7/2010 | Hill .......................... | G06F 1/10 |
| | | | 713/600 |
| 2012/0301100 A1* | 11/2012 | Pereira ..................... | H04N 5/77 |
| | | | 386/E5.002 |
| 2014/0266416 A1* | 9/2014 | Dally ....................... | H05K 1/11 |
| | | | 327/564 |
| 2016/0026479 A1 | 1/2016 | Rosenzweig et al. | |
| 2016/0321385 A1* | 11/2016 | Chen ...................... | G06F 30/347 |
| 2017/0003725 A1 | 1/2017 | Rosenzweig et al. | |
| 2018/0101502 A1 | 4/2018 | Nassif et al. | |
| 2020/0183597 A1 | 6/2020 | Das et al. | |

FOREIGN PATENT DOCUMENTS

| | | |
|---|---|---|
| JP | 2009-522688 A | 6/2009 |
| KR | 10-2008-0097419 A | 11/2008 |

OTHER PUBLICATIONS

International Preliminary Report on Patentability issued Jan. 5, 2023 for International Patent Application No. PCT/US2020/039974, 7 pages.

Office Action, JP App. No. 2022-572595, Jun. 4, 2024, 6 pages (3 pages of English Translation and 3 pages of Original Document).

International Search Report and Written Opinion mailed Mar. 19, 2021 for International Patent Application No. PCT/US2020/039974, 10 pages.

Notice of Allowance, JP App. No. 2022-572595, Sep. 17, 2024, 4 pages (1 page of English Translation and 3 pages of Original Document).

* cited by examiner

| PM_GENERIC_INTFC | | | | | | | | | Line # | Type |
|---|---|---|---|---|---|---|---|---|---|---|
| 8b | 8b | 8b | 8b | 8b | 8b | 8b | 8b | 8b | | |
| Fabric Domain Ratio Status 7 | Fabirc Domain Ratio Status 6 | Fabirc Domain Ratio Status 5 | Fabric Domain Ratio Status 4 | Fabric Domain Ratio Status 3 | Fabric Domain Ratio Status 2 | Fabric Domain Ratio Status 1 | Fabric Domain Ratio Status 0 | 1 | RO |
| Fabric Domain Ratio Status 15 | Fabric Domain Ratio Status 14 | Fabirc Domain Ratio Status 13 | Fabric Domain Ratio Status 12 | Fabric Domain Ratio Status 11 | Fabric Domain Ratio Status 10 | Fabric Domain Ratio Status 9 | Fabric Domain Ratio Status 8 | 2 | RO |
| Fabric Domain Ratio MAX LIMIT 7 | Fabric Domain Ratio MAX LIMIT 6 | Fabric Domain Ratio MAX LIMIT 5 | Fabric Domain Ratio MAX LIMIT 4 | Fabric Domain Ratio MAX LIMIT 3 | Fabric Domain Ratio MAX LIMIT 2 | Fabric Domain Ratio MAX LIMIT 1 | Fabric Domain Ratio MAX LIMIT 0 | 3 | RW |
| Fabric Domain Ratio MAX LIMIT 15 | Fabric Domain Ratio MAX LIMIT 14 | Fabric Domain Ratio MAX LIMIT 13 | Fabric Domain Ratio MAX LIMIT 12 | Fabric Domain Ratio MAX LIMIT 11 | Fabric Domain Ratio MAX LIMIT 10 | Fabric Domain Ratio MAX LIMIT 9 | Fabric Domain Ratio MAX LIMIT 8 | 4 | RW |
| Fabric Domain Ratio MIN LIMIT 7 | Fabric Domain Ratio MIN LIMIT 6 | Fabric Domain Ratio MIN LIMIT 5 | Fabric Domain Ratio MIN LIMIT 4 | Fabric Domain Ratio MIN LIMIT 3 | Fabric Domain Ratio MIN LIMIT 2 | Fabric Domain Ratio MIN LIMIT 1 | Fabric Domain Ratio MIN LIMIT 0 | 5 | RW |
| Fabric Domain Ratio MIN LIMIT 15 | Fabric Domain Ratio MIN LIMIT 14 | Fabric Domain Ratio MIN LIMIT 13 | Fabric Domain Ratio MIN LIMIT 12 | Fabric Domain Ratio MIN LIMIT 11 | Fabric Domain Ratio MIN LIMIT 10 | Fabric Domain Ratio MIN LIMIT 9 | Fabric Domain Ratio MIN LIMIT 8 | 6 | RW |
| | | | | | | | UFS_MODE_SELECT [0:2] | 7 | RW |
| ... | | | | | | | | | |

PERFORMANCE LEVEL CONTROL IN A DATA PROCESSING APPARATUS

CROSS REFERENCE TO RELATED APPLICATIONS

This application is a national phase entry under 35 U.S.C. § 371 of International Application No. PCT/US2020/039974, filed Jun. 26, 2020, entitled "PERFORMANCE LEVEL CONTROL IN A DATA PROCESSING APPARATUS," which designated, among the various States, the United States of America. The Specification of the PCT/US2020/039974 application is hereby incorporated by reference in its entirety for all purposes, except for those sections, if any, that are inconsistent with this application.

TECHNICAL FIELD

Embodiments described herein generally relate to the field of performance level control in a data processing apparatus and more specifically to implementing performance level control in a communication fabric of a data processing apparatus.

BACKGROUND

On processing platforms, active power management may be performed by dynamically scaling at least one of voltage and frequency, a technique known as Dynamic Voltage and Frequency Scaling (DVFS). The DVFS may be performed when processors or other data-handling functional units demand higher (or lower) performance states and may be based on changes in unit utilization. Higher performance states (higher frequency states) are often granted by a DVFS controller unless there is some other constraint or limit that mitigates against the higher frequency choice, such as detection of thermal violations or peak current violations during processing. A processing platform such as a server may be provided as a System-on-Chip (SoC) which may host a plurality of data-handling functional units such as multiple compute units each comprising a plurality of cores, an IO controller, a memory controller and a Graphic Processing Unit (GPU). Communication between the data-handling functional units on a SoC is performed via a "fabric" of data communication channels. The communication fabric may have a ring, bus or mesh topology and operates with a given performance level (Voltage and frequency combination) throughout the fabric. A single fabric may span an entire SoC. Examples of a data-handling functional units include a compute die, a memory die or an Input/Output (IO) die.

Data processing platforms such as servers may use a single coherent sub-system as a single communication fabric between all data-handling functional units. Since DVFS algorithms for such servers set the performance level of the fabric to be the same globally and based on performance counters and constraints from data-handling functional units spanning the whole SoC, the operating frequency of the fabric may be set such that some portions of the fabric are constrained to run at a higher Voltage and frequency combination than appropriate. This can result in power wastage. Furthermore, tight coordination of multiple Phase Locked Loops (PLs) and Fully Integrated Voltage Regulators (FIVRs) for respective data-handling functional units on a SoC, can result in complex global architectural flows. Buffering of data across different fabrics operating at different frequencies can give rise to latencies of several clock cycles and also makes loss of data during transmission more likely and is therefore likely to be detrimental to performance. It will be appreciated that power optimization and performance optimization can be difficult to balance in a data processing apparatus. Fabric power consumption has recently become a main power, performance and design bottleneck in data processing apparatus such as servers.

BRIEF DESCRIPTION OF THE DRAWINGS

Embodiments described herein are illustrated by way of example, and not by way of limitation, in the figures of the accompanying drawings in which like reference numerals refer to similar elements:

FIG. 10 schematically illustrates an example user interface for setting power constraints for a single communication fabric having two or more performance level domains.

DESCRIPTION OF EMBODIMENTS

Illustrative embodiments of the present disclosure include, but are not limited to, methods, systems and apparatuses and machine-readable instructions for single communication fabric power management in a data processing apparatus.

Figure 1:
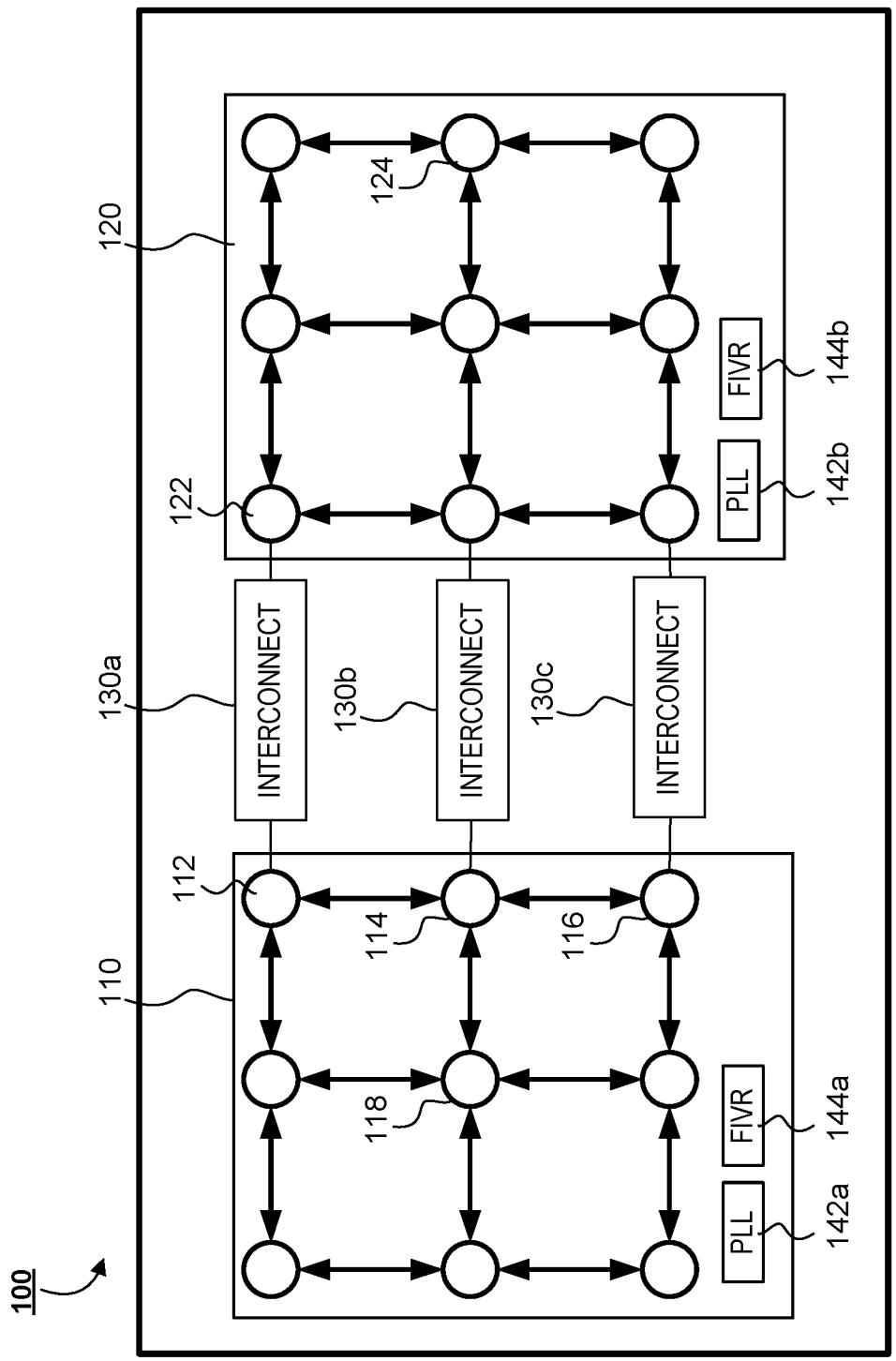
FIG. 1 schematically illustrates a single communication fabric for a data processing apparatus, the single communication fabric having an interconnection region.

FIG. 1 schematically illustrates a single communication fabric 100 for a data processing apparatus. A fabric may be defined to have a known set of sources, destinations, routing rules, topology and other properties. The sources and destinations may be any type of data handling functional unit. The single communication fabric in this example comprises a first die 120 and a physically separate second die 120. The first die 110 has a component node 116 and eight further components nodes. Examples of component nodes include a core agent, a memory controller and an input output agent. Three of the nine component nodes 112, 114, 116 are at a periphery of the first die 110 where it forms an interface with the second die 120. The component node 112 on the first die 110 communicates with a corresponding component node 122 on the second die 120 via a first interconnect 130*a* provided at the die boundary 150. Two further interconnects 130*b* and 130*c* are provided at the die boundary 150. In this example the two dies 110, 120 are the same size and each die boundary component node 112, 114, 116 has a corresponding interconnect, but in alternative examples just one or two (i.e. a subset) of the peripheral component nodes at a die boundary may be provided with interconnects. Each die 110, 120 may have a corresponding Fully Integrated Voltage Regulator (FIVR) 142*a*, 142*b* and Phase Locked Loop (PLL) 144*a*, 144*b*. There may be a single clock source for the entire fabric 100 so that the operating frequency may be the same for all component nodes and data communication channels (e.g. wires) of the fabric 100. However, the individual PLLs may be used to create different interconnection domains within the single fabric in which operating frequency and voltage of the fabric is controllable domain-by-domain. Note that the operating frequency and voltage of nodes and a mesh of the fabric may not be related to the operating frequencies and voltages of the core and memory connected via the mesh.

The interconnects 130*a*, 130*b*, 130*c* provide electrical connection between the two physically distinct dies 110, 120 at their boundary and may provide at least data lanes and clock lanes and optionally control lanes. A transmitter circuit (not shown) of one die may be connected to a receiver circuit (not shown) of the adjacent die via one or more of the interconnects 130*a*, 130*b*, 130*c*. Communication between the two dies via the single fabric may be uni-directional, bi-directional or both. The transmitter(s) and receiver(s) may be provided in one or more of the dies 110, 120 and/or in the interconnects 130*a*, 130*b*, 130*c*.

Examples of agents that may be connected to any component node of the single communication fabric 100 to form a hardware processor are a memory controller, a processor, a Last Level Cache (LLC), a cache circuit, a decode unit and such like. In the FIG. 1 example, the first and second dies 110, 120 are of the same size but in alternative examples the sizes of the interconnected dies may differ. Furthermore, more than two dies may be interconnected to form a processing package. A single SoC may comprise a single die comprising multiple components such as multiple cores and associated memory or alternatively a SoC may use two or more different dies to host the numerous components as illustrated by the FIG. 3 example. A data processing apparatus according to the present technique may comprise two or more compute sockets such as the SoC of FIG. 3. Data may be communicated across the fabric 100 via packets according to a routing algorithm such that, for example, packets may be first routed vertically from a source component to a destination component at a different location on the fabric and then may be routed horizontally. Each component 112 of the fabric may correspond to a converged/common mesh stop (CMS) that facilitates an interface between an agent such as a core or memory controller or input output agent and the fabric 100.

A die 110, 120 may comprise execution circuitry for executing program instructions and may further comprise a Last level Cache (LLC) component. LLC is a shared highest-level cache that may be called before accessing memory and it may be sliced into multiple independently accessible components. The LLC may be shared between multiple cores on a compute socket formed from a plurality of dies as described below with reference to FIG. 3.

The dies 110, 120 of the single communication fabric 100 each have a two-dimensional (2D) mesh interconnect topology of data communication channels in this example. The fabric may have an alternative topology such as a ring topology or a bus topology. The mesh of FIG. 1 is a fabric comprising a 2D array of half rings forming a system wide (e.g. SoC wide) interconnect grid of data communication channels. Every vertical column of components forms a bi-directional half ring and similarly, every horizontal row forms a bi-directional half ring. This allows for components such as the component 112 to have connections to any other component of the fabric 100 going through any of the rows and columns of the mesh and allowing for a shortest path between any two components. This can reduce latency and improve bandwidth relative to alternative fabric topologies such as ring topologies.

For example, if component node 114 has a CMS connected to a core agent (single core) and component node 124 has a CMS attached to a memory controller agent then data packets from the core agent may be routed to the memory controller agent vertically to component 116 and then horizontally to component node 124 via the interconnect 130*b*. A return path may differ from the outward path since vertical routing is performed before horizontal routing in this example. Note that a single die 110 may comprise a plurality of agents related to computation, I/O and memory control.

A processor core is an independent execution unit that can run one program thread at a time in parallel with other cores. A die is a single continuous piece of semiconductor material (e.g. silicon) where transistors or other components making up a processor core may reside. Multi-core processors may have two or more processors on a single die, but alternatively, the two or more processors may be provided on two or more respective dies. A single fabric may span multiple dies, but in this case the die boundaries are provided with an interconnect mechanism arranged to provide a latency for data communication between component nodes 112, 122 across the die boundary that is at least close to a latency achievable between different components on the same die via the mesh. In this description the term "dielet" may be a physically distinct semiconductor die, but a die that is connected to an adjacent die in a way that allows the fabric across the die boundary to function like a single fabric rather than as two distinct fabrics. Thus at least some dies may be dielets. This may be contrasted with, for example, a dual processor system in which two different fabrics are connected via a bridge in a single package, where the bridge is a point-to-point interconnect bridge whose latency is lower than the intra-mesh latency of either of the two different fabrics. The intra-fabric latency is very low relative to a latency achievable via a bridge (or similar) connecting two physically distinct fabrics. An expectation where there is a "single fabric" spanning die boundaries is that a latency of the interconnect is at or close to the intra-fabric latency. The intra-fabric bandwidth is also likely to be higher than an inter-fabric bandwidth via a bridge, but the bandwidth also depends on a number of connecting wires whereas latency does not.

Figure 2:
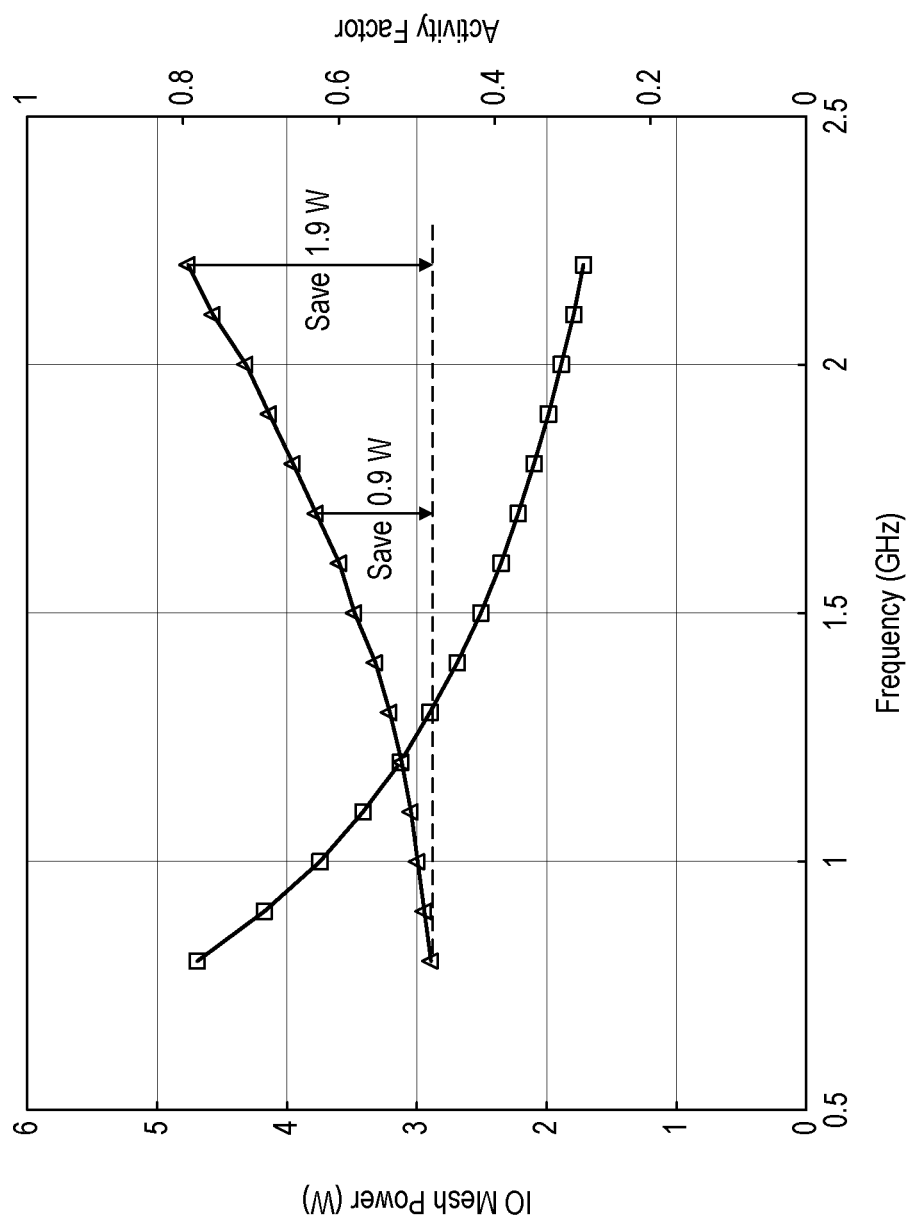
FIG. 2 is a graph schematically illustrating a variation of each of a mesh power in Watts and of an Activity Factor with fabric operating frequency in Giga Hertz (GHz) based on simulation results.

FIG. 2 is a graph schematically illustrating a variation of a mesh power in Watts with fabric operating frequency in Giga Hertz (GHz) and variation of an Activity Factor with fabric operating frequency in GHz based on simulation results. The Activity Factor indicates an average number of switching events undergone by transistors in a SoC and is a dimensionless quantity. A curve 222 with triangle data points shows a variation of IO mesh power in Watts with frequency in GHz and a trend can be seen for power to increase non-linearly from about 3 W for a fabric operating frequency of 1 GHz to around 4.2 W for a fabric operating frequency of 2 GHz. A curve 224 going through square data points shows a variation of the Activity Factor with the fabric operating frequency such that the activity factor is approximately six at an operating frequency of 1 GHz and three at 2 GHz. The activity factor is shown in FIG. 2 to decrease non-linearly as frequency increases. The Activity Factor is an indication of fabric utilization.

The power consumption of the fabric in an IO die (one type of data-handling functional unit) for Standard Performance Evaluation Corporation (SPEC) workloads at frequency of 2.2 GHz is about 4.8 W. SPEC workloads are widely used to evaluate performance of computer systems. At the same frequency, the Activity Factor for the fabric in IO die is less than 0.3. This means that reducing an operating frequency of the fabric from 2.2 GHz to 800 MHz can reduce power consumption by about 2 W. This same frequency decrease will increase the activity factor. However, even at a low frequency of 800 MHz, the activity factor is below 0.8. Therefore, according to these simulation results it is possible to save 2 W of power with little or no adverse performance impact. For workloads with even lower activity factor, one can reduce the frequency below the 800 MHz limit of FIG. 2 and get more than 2 W of power savings. Power consumption and Activity Factor are workload dependent as well as frequency dependent.

Figure 3:
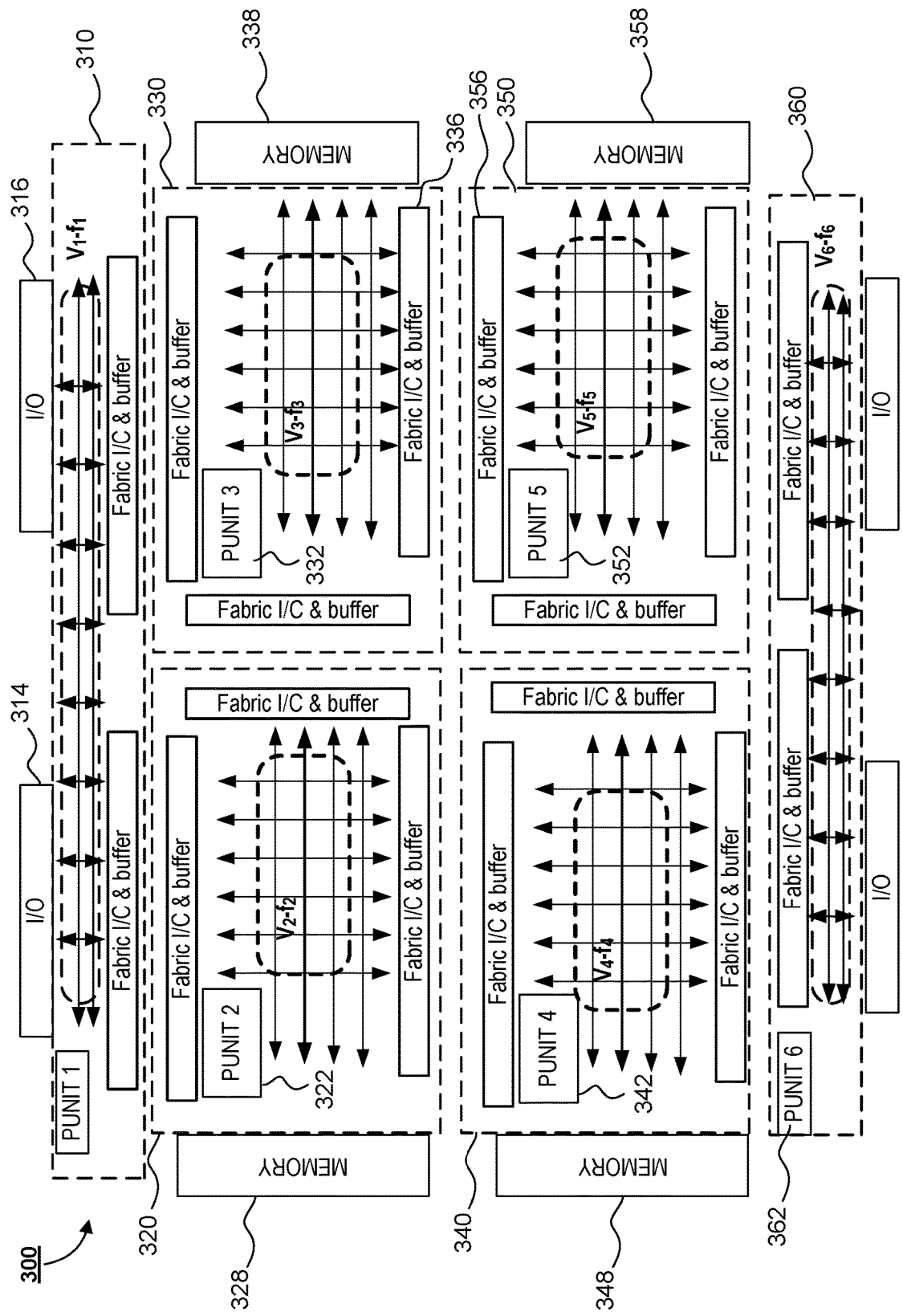
FIG. 3 schematically illustrates a plan of a server System on Chip (SoC) having six "dielets" connected by interconnect boundaries and the server SoC has a single fabric that is partitioned into domains along dielet boundaries.

FIG. 3 schematically illustrates a plan of a server SoC 300 having six "dielets" connected by interconnect boundaries that allow inter-dielet communication at a similar latency to intra-dielet communication. A single dielet may comprise one core or multiple cores provided on multiple respective fabric nodes and may further comprise other components of a "CPU system" such as memory, fabric and such like. A first dielet 310 comprises two IO cores 314, 316 and a first power management unit 312. A second dielet 320 comprises five processor cores (not shown) at respective nodes of the mesh fabric within the dielet and at least one memory controller agent at a different node to provide access to a memory 328 shown adjacent to the dielet and further comprises a second power management unit 322. In alternative examples any number of cores may be provided on a processor (or compute) dielet such as the first dielet or the second dielet, together with further agents at nodes of the fabric. Similarly to the second dielet, a third dielet 330, a fourth dielet 340 and a fifth dielet 350 each comprise five processor cores and memory controller agents in this example and each dielet has a respective local power management unit 322, 332, 342, 352. Each of the four processor dielets 320, 330, 340, 350 has a respective memory dielet 328, 338, 348, 358 on the one of its four boundaries where it does not interconnect with an adjacent processor dielet or IO dielet 310, 360. A sixth dielet 360 at the bottom of the plan is a mirror image of the first dielet 310 and also comprises two IO cores and a sixth power management unit 362. Each of the six dielets has an associated local power management unit 362 provided on the respective dielet.

Each of the six dielets may have a dedicated FIVR and PLL (similarly to the dies shown in FIG. 1) that may be controlled by one or more power control unit to dynamically alter a frequency of operation of the fabric of the corresponding dielet via DVFS. Each of the processor dielets is provided with a fabric interconnect and buffer on the three of the four edges of the dielet that do not interface with the memory dielet 328, 338, 348, 358.

In previously known server SoCs a single communication fabric is operated at a given operating frequency (f) and voltage (V) spread across multiple physical dielets despite the availability of PLLs and FIVRs on individual dielets. The single voltage and frequency (V-f) domain spanning multiple physical dielets was chosen due to hardware architectural dependencies. The global V-f would be selected based on a power management unit monitoring multiple inputs from across the entire SoC. Example inputs used to determine the global performance level may include one or more performance counters, perf-p limit, model specific register (MSR) customer overrides, socket thermal limit, and Running Average Power Limit (RAPL). The target frequency might be selected based upon a maximum requested frequency across all processor cores on the SoC, although other constraints like temperature and power might mean that a requested target frequency is not granted by the power management unit. However, operating at a single V-f across the entire SoC fabric means implementing a tightly coupled architectural flow to change V-f across all of the dielets of the SoC in a coordinated way. Tight coordination of all the PLLs and FIVRs across the fabric partitions leads to complex global architectural flows. Furthermore, a single V-f domain may constrain large portions of fabric to run at higher V-f than needed based on the prevailing workload of the respective fabric portion, which causes wastage of power and diminished performance. It is possible to obtain improved power and performance optimizations for a SoC by using multiple different V-f domains under non-homogeneous fabric traffic-distribution. Some example scenarios include:

However, one disincentive to allowing for different performance level (V-f) domains on a single communication fabric is due to the challenge of managing latency that can potentially be incurred when communicating data from a higher operating frequency dielet to a lower operating frequency dielet (i.e. where there is a frequency mismatch). There is a further challenge of preventing inadvertent data loss due to discrepancies in operating frequencies between different dielets. One option to compensate for the frequency mismatch between different fabric domains might be to implement an asynchronous FIFO (first in first out) buffer at dielet interfaces. However, such an asynchronous FIFO may lead to a latency of two to three cycles, which could be unacceptably high due to consequences of diminished performance of the single shared fabric. An asynchronous FIFO refers to a FIFO design where data values are written to a FIFO buffer from one clock domain and the data values are read from the same FIFO buffer from another clock domain, where the two clock domains are asynchronous to each other.

Figure 5:
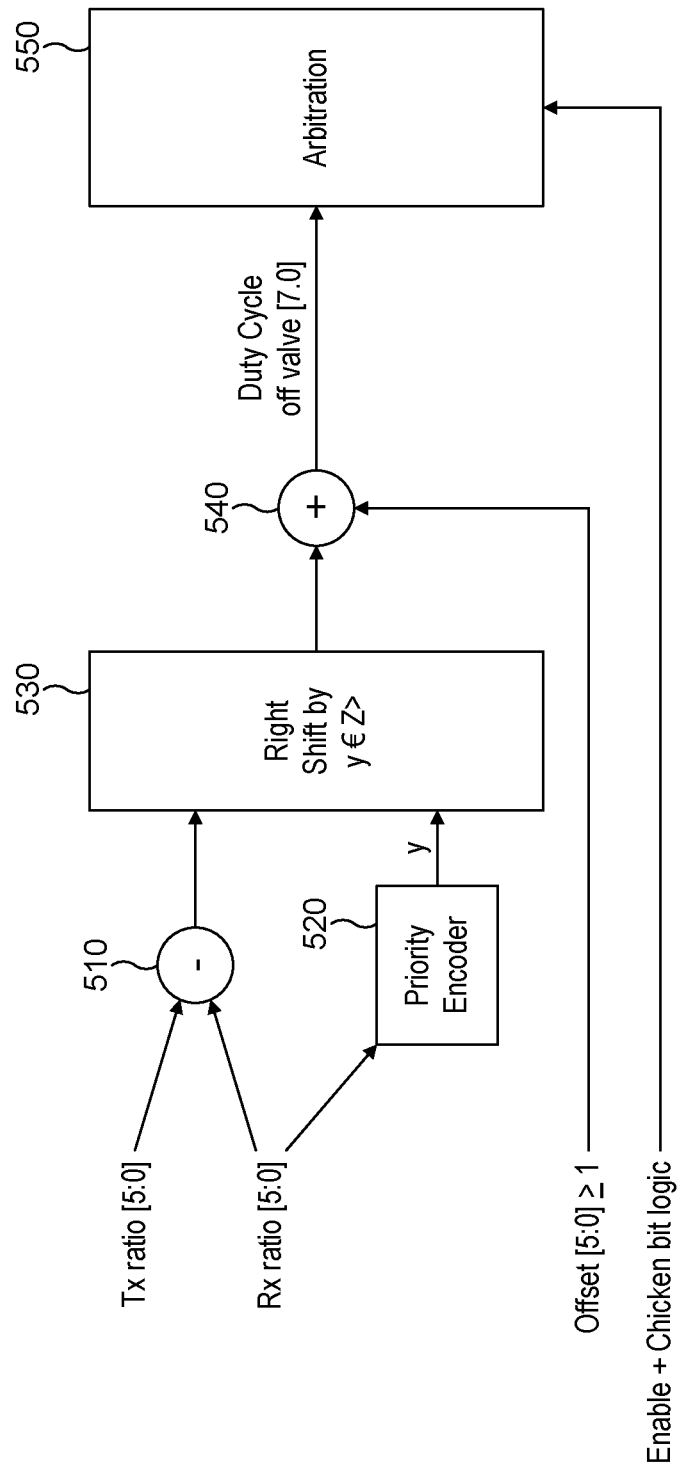
FIG. 5 schematically illustrates an example implementation of backflow control circuitry providing an interface between two different fabric domains operating at different frequencies.

The present technique allows a single fabric to be divided into two or more fabric domains whose performance levels (e.g. operating frequency) can be independently set and set to mismatching values. For example a first fabric domain may provide data communication channels between a first subset of data-handling functional units and a second, different, fabric domain may provide a second different set of data-handling functional units of the data processing apparatus. One fabric domain may comprise all of the data-handling functional units on a compute die and another fabric domain may comprise all of the data-handling functional units on an IO die. Alternatively, data-handling functionals units from different physical dielets may be grouped as part of the same fabric domain. This multi-domain fabric may be implemented in a way that reduces latency and yet avoids inadvertent loss of data that could otherwise result from frequency mismatches across fabric domain boundaries. At each of the dielet boundaries in the FIG. 3 server SoC, backflow control circuitry (not shown) is provided in the fabric interconnect and buffer unit 324 that allows buffering of data for transmission to a dielet operating at a lower frequency from a dielet operating at a higher frequency. One example implementation of the backflow control circuitry is schematically illustrated in FIG. 5.

In the SoC of FIG. 3, each of the six dielets 310, 320, 330, 340, 350, 360 may be independently set to operate at an appropriate operating frequency (or other performance level) for the corresponding fabric domain. Thus, for example, if a current workload level of the fifth dielet 350 is lower than a workload of the third dielet 330, then the fifth power control unit 352 may set an operating frequency of the fifth dielet 350 to be higher than an operating frequency of the third dielet 330. Thus if data is to be transmitted across the fabric from the fifth (higher frequency) dielet to the third (lower frequency) dielet then backflow control circuitry in the fabric I/C and buffer unit 356 will control a data flow rate of the transmission and will buffer data pending transmission by recirculating the data in the fabric of the fifth dielet 350 preventing data loss.

FIG. 3 shows six different interconnection domains of the fabric having distinct performance levels ($V_i$–$f_i$) to coincide with six respective different dielet boundaries. However, in alternative arrangements, the interconnection domains of the fabric may be formed within a single dielet or partitions demarcating the different domains may span two or more dielets in a way that does not coincide with dielet boundaries. Different interconnection domains may be formed in a variety of different ways provided that circuitry is available to independently set a frequency and voltage of each interconnection domain. Different fabric domains may provide data communication channels for respective different subsets of data-handling functional units connected by a single fabric. A subset may comprise one or more data-handling functional unit installed at a component node of a fabric such as a fabric having a mesh topology.

The SoC 300 having plural cores, memory, fabric and I/O provided on a plurality of different dielets may be denoted a "compute socket". Two or more compute sockets may be connected together by electrical connectors such as copper wires to form a data processing apparatus. Connections between the compute sockets are likely to be high latency relative to communication channels within the single fabric of a given compute socket.

Any data traffic flowing through the single communication fabric of the SoC 300 of FIG. 3 may not be aware of the six different fabric domains. When two adjacent fabric domains operate at different frequencies, it is possible to inadvertently cause a traffic bottleneck in a slow fabric domain by transmitting too much traffic into it too rapidly from a faster fabric domain. This can result in loss of data that is transmitted but cannot be processed rapidly enough upon reception. To ameliorate such a data loss, a dynamic back-pressuring throttling mechanism is implemented according to the present technique to control traffic going from a faster fabric domain into a slower fabric domain. Control parameters of the throttling mechanism are determined depending on a magnitude of a frequency difference between the two fabric domains.

Consider two different fabric domains, one denoted a "local die", which is a transmitter (Tx), and another different fabric domain denoted a "remote die", which is a receiver (Rx). An interesting case with potential for traffic loss can occur when the Tx fabric is operating faster than Rx fabric. Using backflow control circuitry according to the present technique to perform throttling of data being transmitted, an ON/OFF bidding of transactions is implemented and a counter is set up based on a "duty cycle" waveform. This allows data transactions to bid in the ON phase, but not in the OFF phase. In other words, data packets may be communicated from the local die to the remote die in the ON phase but no communication of data packets is permitted in the OFF phase. Thus:

Duty Cycle (DC) ON: Send data packets on these clock cycles

Duty Cycle (DC) OFF: Do not send data packets on these clock cycles

If a packet is sent from Tx to Rx on one cycle (DC ON=1), then a DC OFF may be determined, i.e., how many cycles for which the sending the traffic is suppressed after sending the traffic for one cycle. The clock cycles of DC On and DC OFF are clock cycles of the local (higher frequency) die. As an example, when DC ON is one and DC OFF is two, the fraction of time packets are sent is equal to ⅓ and the fraction of time the packets are not sent is equal to ⅔. Note that for each new combination of the Tx and Rx frequencies, it is appropriate to calculate a new duty cycle value. This makes the duty cycle determination non-trivial. According to the present technique an example implementation duty cycle value determination is provided and a low overhead hardware approximation of the same of the duty cycle determination is also provided. The hardware approximation is implemented by the backflow control circuitry illustrated in FIG. 5.

To determine the duty cycle value, consider denoting a frequency of the fabric in terms of "$x_{ratio}$". In one example, the unit of the ratio implies a frequency of 100 MHz. Therefore, a ratio of 20 implies a frequency of 2000 MHz, or 2 equivalently, GHz.

Figure 4:
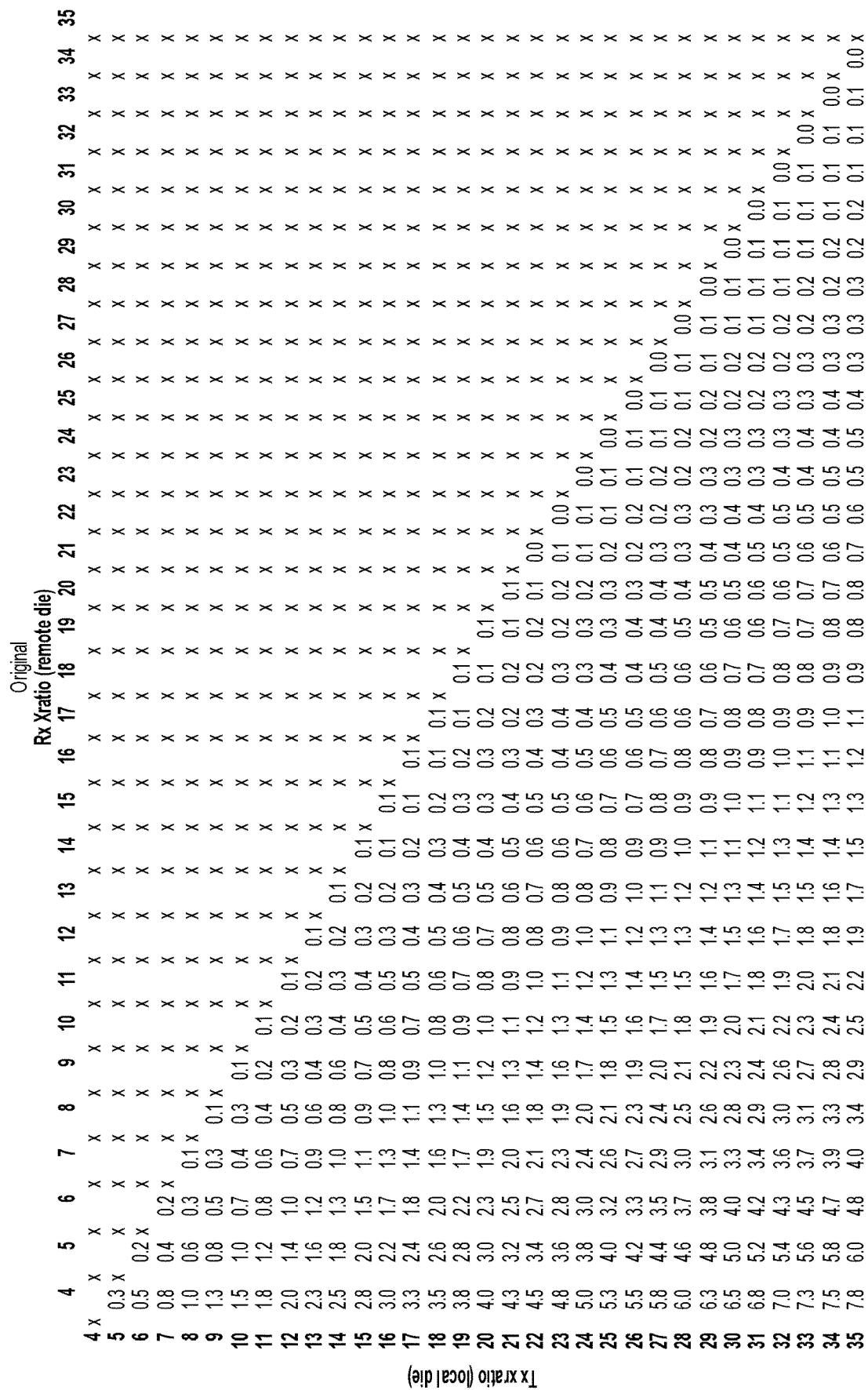
FIG. 4 is a table illustrating calculated values of DC OFF to perform data throttling for a range of local die Tx frequencies and a range of remote die Rx frequencies in a single fabric having at least two performance level domains.

The FIG. 4 table shows decimal number of DC OFF cycles for an "ideal" throttling mechanism. When $x_{ratio_{Rx}} \geq x_{ratio_{Tx}}$, the packets should not be inadvertently dropped (shown in the table of FIG. 4 as a data cross point). This indicates that DC OFF should be zero. However, when $x_{ratio_{Rx}} < x_{ratio_{Tx}}$, the Tx die transmits packets on every DC ON=1 cycle and then it is appropriate to stop transmission for a number of DC OFF cycles, which can be computed as follows:

$$DC\ OFF = \frac{x_{ratio_{Tx}} - x_{ratio_{Rx}}}{x_{ratio_{Rx}}} \quad (1)$$

However, since throttling of data for transmission can only be implemented at a granularity of a full number of clock cycles, any fractional numbers for DC OFF are rounded to full integers. FIG. 4 is a table schematically illustrating calculated values of DC OFF based on equation (1) above for a range of local die Tx frequencies from $x_{ratio_{Tx}}$ of 4 through to 35 (corresponding to 400 MHz through to 3.5 GHz) and a range of remote die Rx frequencies from $x_{ratio_{Rx}}$ of 4 through to 35. The table entries in the lower diagonal region of FIG. 4 all correspond to the Tx frequency exceeding the Rx frequency and the numerical entries in the lower left diagonal correspond to a number of DC OFF cycles as calculated from equation (1) prior to rounding to the nearest integer. The larger the discrepancy between the Tx frequency and the Rx frequency, the greater the number of DC OFF cycles that is appropriate.

Although equation (1) could be implemented in hardware to perform the appropriate throttling of data, implementing division in hardware is computationally expensive. Furthermore, decoder logic that would be implemented to map Tx to Rx die frequency ratios according to equation (1) could be complex. Furthermore, implementing equation (1) in hardware may exhibit poor scalability as Rx and Tx increase. A more efficient and less complex computation can be performed in hardware by approximating the DC OFF calculation of equation (1) using a right shift instead of a division. This makes sense because the shift operation provides a good approximation and yet is less computationally expensive that a division. According to one implementation, equation (1) is approximated according to the following equation:

$$DC\ OFF = (x_{ratio_{Tx}} - x_{ratio_{Rx}}) >> y + offset$$

$$where, y = floor(\log_2 x_{ratio_{Rx}}) \quad (2)$$

FIG. 5 schematically illustrates backflow control circuitry representing a hardware implementation of Equation (2). The circuit of FIG. 5 comprises a subtractor 510, a priority encoder 520, a shifter circuitry unit 530, an adder 540 and arbitration circuitry 550. The priority encoder is priority encoder is a digital circuit that selects an index of the most significant bit that is '1' in a binary number. For example, in a binary number 01001, the priority encoder will give an output of 3. So for y=3 a division by 23 is performed right shifting the difference in the of Tx ratio and Rx ratio in Equation (2). The subtractor 510 receives a six-bit Tx ratio ($x_{ratio_{Tx}}$) as a first input and subtracts from that value a six-bit Rx ratio ($x_{ratio_{Rx}}$) and outputs a result of this subtraction as input to the shifter circuitry unit 530. The shifter circuitry unit 530 performs a right shift of the subtraction result by an integer number, y, of bit positions and supplies the shifted difference value to the adder 540. The integer y corresponding to the magnitude of the right shift is calculated by the priority encoder 520 depending on the six-bit Rx ratio ($x_{ratio_{Rx}}$), which is supplied as input to the priority encoder. The adder 540 receives a first input corresponding to the right shifted difference value output by the shifter circuitry 530 and a second input to the adder is an eight bit offset having a value greater than or equal to one. The offset value is provided to allow compensation for clock skew, which is a phenomenon whereby a clock signal from a given source may arrive at different circuit components at different times. Clock skew can add a fraction of a cycle to a DC OFF value, which can potentially increase the calculated DC OFF time by up to one clock cycle. In a tuning phase a value of offset=2 can be set initially to account for worst case clock skew in different functional units (e.g. Stock Keeping Units, SKUs) of the SoC. After tuning to compensate for clock skew, the offset can subsequently be set to one so that the approximation is functionally correct.

An enable bit that is supplied as one of two inputs to the arbitration circuitry serves to disable throttling, which may be appropriate in the case where $x_{ratio_{Rx}} \geq x_{ratio_{Tx}}$. The other input to the arbitration circuitry 550 is an output of the adder 540 corresponding to a calculated DUTY CYCLE OFF value. Similarly to the enable bit, a set of "chicken bit logic" circuitry may be used to provide an input to the arbitration circuitry and can be used to disable throttling in case the given implementation of throttling is not used in the integrated circuit for any other reason.

The backflow control circuitry 500 may be implemented as part of an interconnect at boundaries between different fabric domains. In examples where the fabric domains coincide with dielet boundaries, such as the FIG. 3 server SoC example, then the backflow control circuitry 500 may be provided in one or more of the fabric interconnect and buffer units 336, 356. Alternatively, the backflow control circuitry may be provided in an intra-mesh region of the fabric proximal to an intra-mesh domain boundary.

The fabric backpressure mechanism provided by the backflow control circuitry of FIG. 5 together with equations (2) and (3) enhances performance of a single fabric having two or more different domains with respective different performance levels by preventing data loss without any extra latency being incurred in the data path. In addition, the proposed backpressure mechanism works across a wide range of frequency mismatch between adjacent domains using minimal hardware logic.

Figure 6:
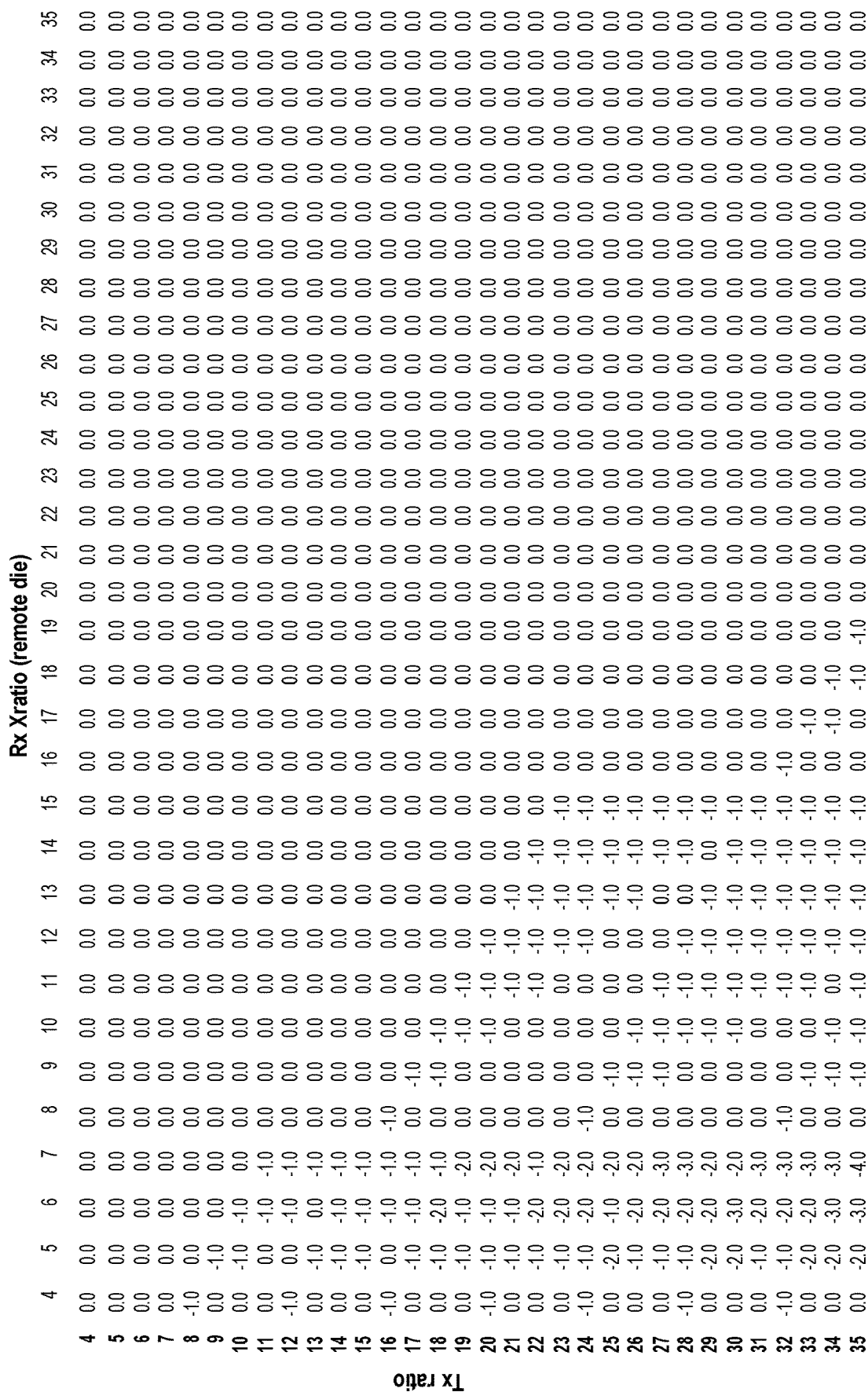
FIG. 6 is a table schematically illustrating a difference between accurately calculated values and approximated values for DC OFF of a throttling duty cycle for the same predetermined range of range of local die and remote die frequency values shown in the table of FIG. 4.

FIG. 6 is a table schematically illustrating a difference between values for DC OFF for the same predetermined range of range of local die and remote die frequency values shown in the table of FIG. 4 as derived from Equation 2 and the approximated DC OFF value derived from Equation 3. In the FIG. 6 table, a table entry of zero indicates perfect approximation (in which case the FIG. 4 table DC OFF value and the approximation of Equation 3 match) and is an ideal case. A positive value does not occur in the FIG. 6 table, which is good, since that could lead to an underestimation of the DC OFF value and have the potential consequence of dropping of packets. A negative value entry in the FIG. 6 table indicates that the approximating logic of the FIG. 5 backflow control circuitry 500 predicts higher throttling than is strictly required by the more precise calculation of the table shown in FIG. 4. This could potentially lead to some minor performance loss; however, this is acceptable due to at least the reasons enumerated below:

i. The remote die is running too slow in most cases where a negative value entry appears in the table (see from the FIG. 6 table). This is an unlikely scenario at runtime (e.g., $x_{ratio_{Tx}}$ at 35 and $x_{ratio_{Rx}}$ at 9). The more likely cases are when the difference in frequencies is not too large.

ii. Even if the difference is large, the traffic required to flow from the Tx die (faster) to Rx die (slower) should be small since the remote die is slower.

iii. The estimation error is in terms of faster frequency cycles (based on the transmitting die operating frequency), which is a small absolute time value. For example, a 4 cycle penalty at 3.5 GHz is smaller in time than a 1 cycle latency at 0.8 GHz.

iv. Having some estimation error is still better than choosing a fixed worst case value of DC OFF=8 across all the Tx and Rx ratios, which has a relatively high performance penalty.

The data path prior to the fabric I/C and buffer unit s336, 356 at the dielet boundary is guaranteed to be an intra-mesh path within the dielet. This should be true even if a boundary between two fabric domains does not coincide with dielet boundaries. Therefore, data should never be lost even in DC_OFF periods. The data on fabric in the transmitting fabric domain is simply bounced and recirculated into the local fabric domain when the buffer in the interconnect region cannot accept more data. This bounced traffic increases the fabric utilization of the local fabric domain, indicating to a corresponding local power control unit through hardware counters that frequency in the local fabric domain should be increased to accommodate recirculation of the bounced data traffic. In summary, the traffic bounces back when the buffer at the fabric domain interface cannot accept more data, but the data awaiting transmission should never be dropped according to the present technique. By way of contrast, implementation of an asynchronous FIFO at fabric domain boundaries instead of using the backflow control circuitry of FIG. 5 to determine a duty cycle for transmission would be highly likely to lead to unacceptable latency and potential loss of data when the local fabric domain operating frequency exceed the remote fabric domain operating frequency.

Figure 7:
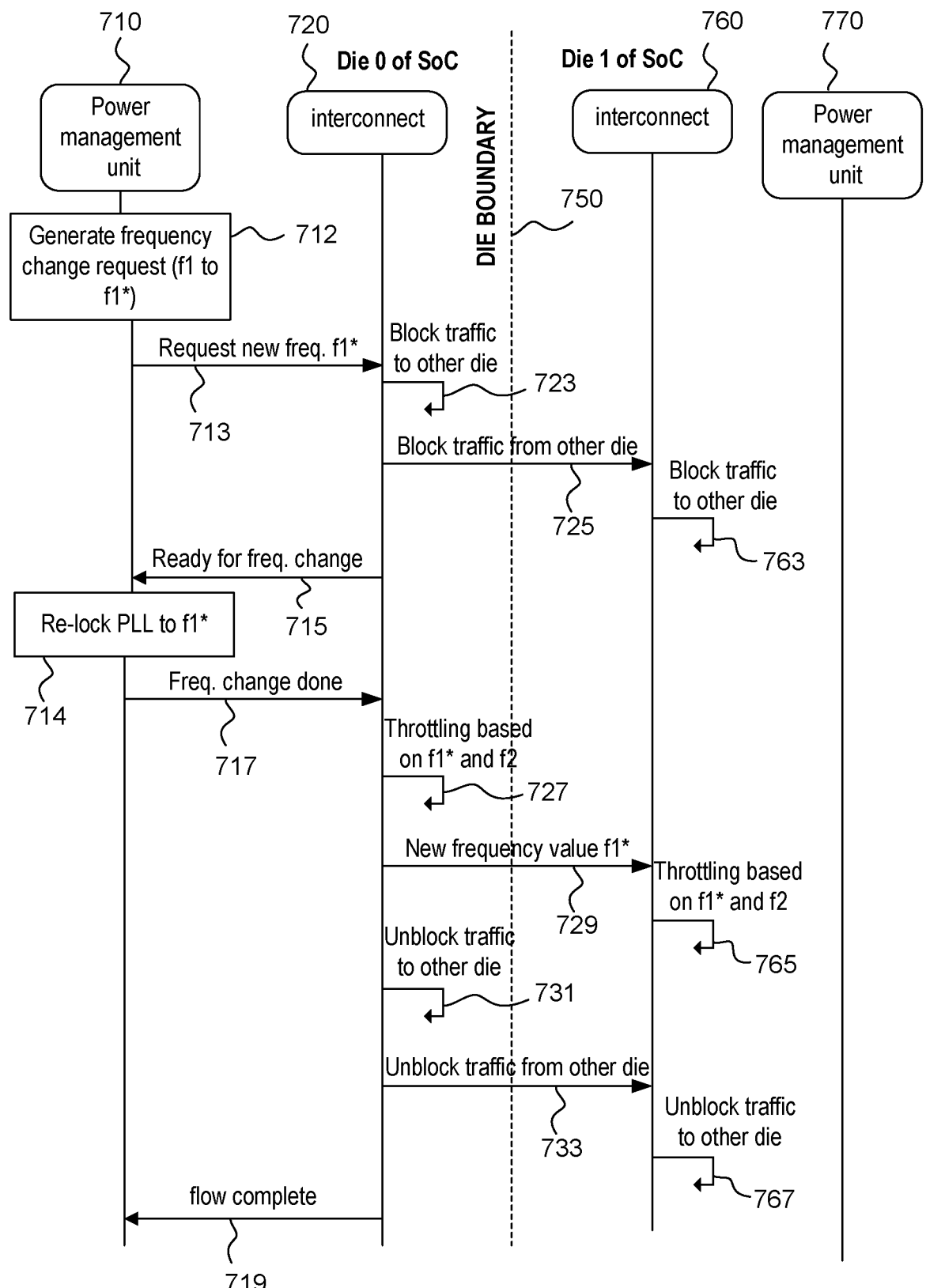
FIG. 7 is a signal diagram schematically illustrating signaling performed at a fabric domain boundary, such as a die boundary, to implement a frequency change of a fabric operational frequency on one side of the domain boundary.

FIG. 7 is a signal diagram schematically illustrating signaling performed at a fabric domain boundary, such as a die boundary, to implement a frequency change of a fabric operational frequency on one side of the domain boundary. For simplicity, in FIG. 7 the low-level implementation details have been abstracted in two main components (Power management unit and interconnect interface). The frequency change may be an increase or a decrease in frequency. In the FIG. 7 example a signal flow is shown for time lines of a first power management unit 710 and a first interconnect 720 corresponding to a first fabric domain and a second power management unit 770 and a second interconnect 760 corresponding to a second fabric domain. In this example a fabric domain boundary 750 coincides with a die boundary between two adjacent dies on the same SoC such that the first power management unit 710 corresponds to a die 0 of the SoC and the second power management unit corresponds to a die 1 of the SoC. However, the domain boundary of the fabric may not coincide with die boundaries in other examples.

At box 712, the first power management unit 710 generates a frequency change request to change the operating frequency of the fabric domain of die 0 from f1 to f1* and sends a signal 713 to the first interconnect 720 requesting a frequency change to f1*. Responsive to the frequency change request signal 712, the first interconnect 720 both: (i) temporarily blocks traffic to die 1 via an internal signal 723; and (ii) sends a signal 725 to the second interconnect 760 to temporarily block incoming traffic from die 1. Responsive to the signal 725 from the first interconnect 720, the second interconnect 760 implements blocking of outgoing traffic to die 0 via an internal signal 763. After traffic in each direction has been blocked, the second interconnect 720 sends a signal 715 to the first power management unit 710 indicating that the respective interconnects are ready for the requested frequency change to be implemented on die 0.

Next at box 714 the first power management unit 710 re-locks its local PLL to the newly requested frequency f1* and then sends a signal 717 to the first interconnect. After the frequency change f1→f1* has been implemented on die 0 then the first interconnect 720 implements throttling using the circuitry of FIG. 5 to determine an appropriate duty cycle via an internal signal 727. Once throttling set-up has been implemented locally on the first interconnect 720, which is on die 0, the first interconnect 720 sends a signal 729 to the second interconnect to inform die 1 of the changed frequency value f1*. Then the second interconnect 760 uses internal signaling 765 to implement the throttling based on the frequency difference between f1* and f2. One might assume that throttling need only be set up on the transmitting die of die0 and die1, but the relationship between f1* and f2 may not be known and thus no assumptions are made. When setting up throttling traffic flow in either of the two directions is a possibility so both dies across the die boundary maybe configured for throttling. After both sides of the interconnect (i.e. fabric domain boundary) have been configured an appropriate throttling duty cycle for the frequency mismatch (f1*–f2) then the first interconnect 720 sends a signal 733 to the second interconnect 760 triggering it to unblock traffic to die 0. Finally at signal 719, the flow is complete and the frequency change in the fabric domain of die 0 has been implemented on the fabric domain boundary.

This implementation of changes to a throttling duty cycle may be performed on more than one fabric domain boundary, depending on how many different fabric domain boundaries the change in the fabric frequency on die 0 impacts upon. In the FIG. 3 example, a change to $V_1$–$f_1$ may trigger a similar signal exchange sequence with each of the second dielet 320 and the third dielet 330. As a further example, a change to $V_3$–$f_3$ may trigger signal sequences with each of the first dielet 310, the second 320 and fifth 350 dielet but not the fourth 340 dielet. According to the signal flow of FIG. 7, simplified non-coordinated flows for DVFS between two interfacing fabric domains is achieved. That is, the fabric on one die may change frequency without the fabric on the other die being also triggered to change frequency.

Figure 8:
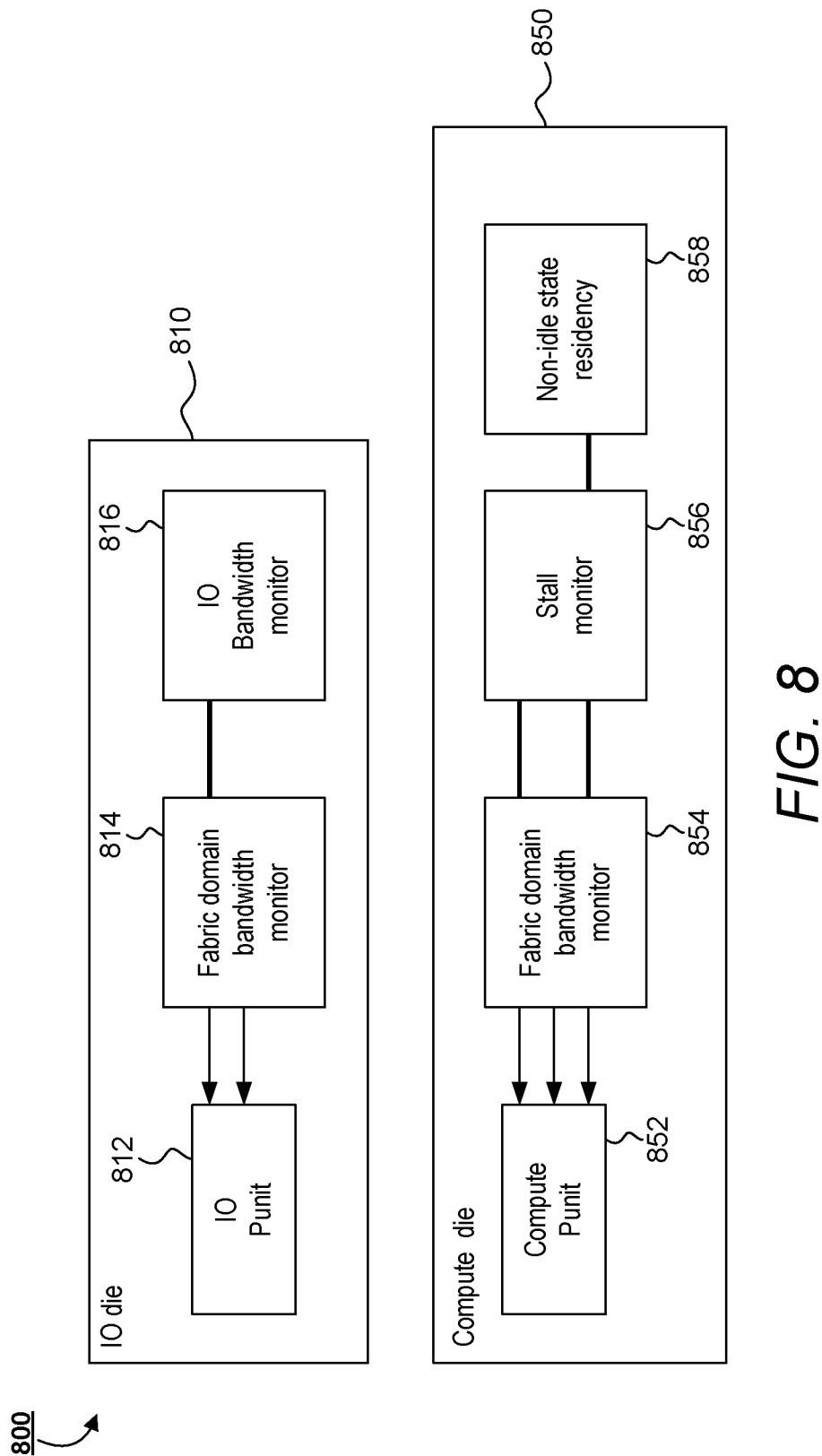
FIG. 8 schematically illustrates how telemetry of data associated with performance level setting is performed on a domain by domain basis of the fabric.

FIG. 8 schematically illustrates how telemetry of data associated with performance level setting is performed on an individual fabric partition (domain) basis in a data processing apparatus according to one example of the present technique. FIG. 8 shows a telemetry system 800 that is sub-divided into an IO die (or domain) 810 and a compute die (or domain) 850. The IO die 810 has an IO power control unit 812, an IO fabric domain bandwidth monitor 814 and an IO bandwidth monitor 816. The compute die 850 has a compute power control unit 852, having a compute power control unit 852, a compute fabric domain bandwidth monitor 854, a stall monitor 856 and a non-idle state residency monitor 858.

In systems which implement a single performance level throughout a single fabric, a single power control unit might receive workload information from at least a plurality of dielets of the SoC and use that collated workload information to determine an appropriate performance level. In this case only one fabric domain bandwidth monitor is likely to be provided. By way of contrast, according to the present technique, distinct fabric domain bandwidth monitors may be provided for each different fabric domain. The dedicated IO power control unit 812 requests a performance level for the IO die based on information from the IO bandwidth monitor 816.

The compute power control unit 852 monitors the prevailing workload using the stall monitor 856 and the non-idle state-residency monitor 858 and requests a compute fabric performance level based on that input without taking into account the IO workload. The non-idle state-residency monitor 858 may monitor a duration for which a core is executing and not idle. Each core of a processor may have a number of core idle states (C-states) and a number of voltage-frequency pairs (P-states) that set the speed and power consumption of the core or processor. When the operating voltage of a processor is lower, so is the power consumption. Different C-states may correspond to clock gating of progressively more components of the SoC. Since the frequency is lowered in tandem with the voltage, a lower frequency results in slower computation. The Power control unit 852 periodically monitors the processor utilization. If that utilization is less than a certain threshold, it may increase the P-state, that is, the data functional unit may the next higher power efficiency state. Ideally, utilization should be as close to 100% as possible.

Figure 9A:
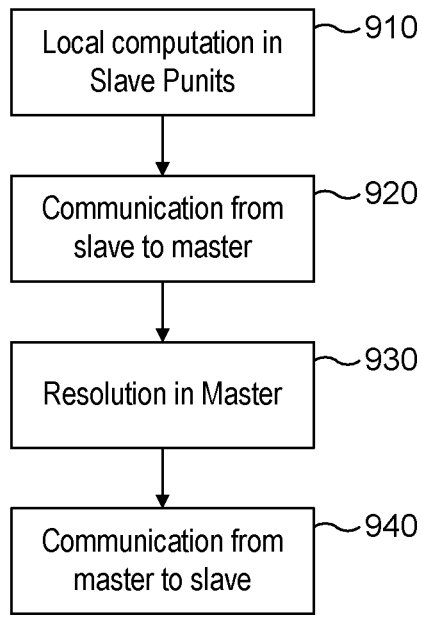
FIG. 9A is a flow chart schematically illustrating hierarchical power management algorithm.
Figure 9B:
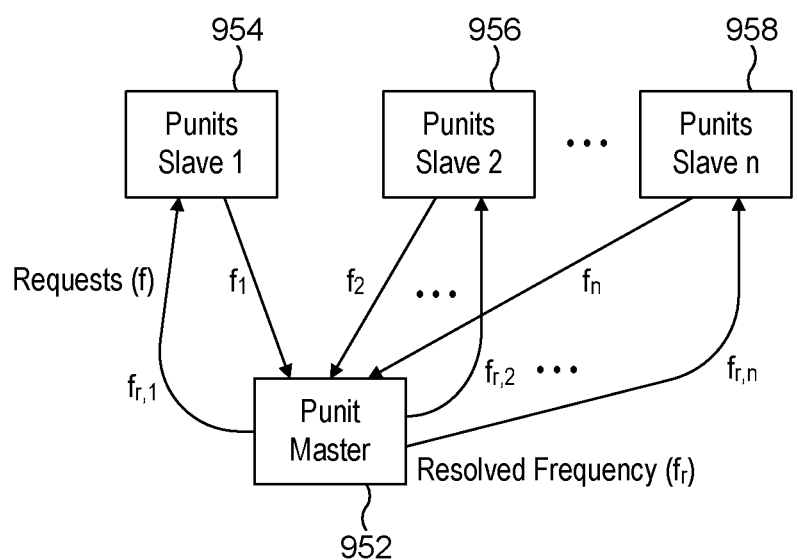
FIG. 9B schematically illustrates a power management unit communication sequence.

FIGS. 9A and 9B schematically illustrate how power management is performed for fabric DVFS. A requested performance level may be determined individually for each distinct fabric domain to take specific account of each of processing workload and mesh bandwidth in the respective domain. The requested performance levels may be collated by a power control master unit that determines whether or not to grant the requested performance levels of the fabric domains depending on at least one constraint. Examples of constraints include maximum total power limit, minimum total power limit, minimum performance level and thermal constraints. In alternative examples a single master power control unit may receive telemetry from two or more dies connected by a single fabric and may control different domains of the fabric to have different performance levels based on that telemetry. In some such examples the master power control unit performs the power control and slave power units need not be provided.

According to the present technique, a hierarchical power management algorithm may be implemented for fabric DVFS involving two or more different domains in a single fabric, the different domains operable concurrently at different fabric operating frequencies. An example hierarchical power management algorithm is schematically illustrated in FIG. 9A. At process element 910 a Punit (power management unit) controller applies a set of heuristic algorithms to find the frequency required for the local dielet fabric portion (domain) after processing a set of telemetry data for the dielet. The frequency may be increased when fabric domain traffic is large and vice versa.

Next, at process element 920 each Punit controller then sends the requested frequency calculated based on the local telemetry to a master Punit 952 (see FIG. 9B). The master Punit 952 resolves the frequency based on user applied limits such as, for example, a perf-p limit, an RAPL limit and an architecture of the system.

At process element 940 the resolved frequency determined by the Punit master 952 is communicated back to the slave Punits 954, 956, 958, which enforces the decision and re-sets the PLLs of the local dies according to the resolved performance level received from the Punit master 952.

In one example implementation, two modes are available for independent fabric control of the data processing apparatus. These modes can be selected from a customer visible interface, as illustrated in FIG. 10.

Mode 1: Legacy mode (entire server fabric is treated as a single domain and will have same frequency)

$$f_{r,i} = \max(f_i) \forall i \in [1, N]$$

Where $f_{r,i}$ is the resolved frequency by the master power control unit for each of the N different fabric domains. In this example a global frequency may be selected as the maximum frequency value of the performance level requests coming from each of the fabric domains.

Mode 2: Independent Fabric DVFS mode in which each fabric domain is treated as a separate entity for the purpose of performance level setting. Also note, that in examples where the LLC is distributed in the data processing apparatus, it could be undesirable to have different frequencies for fabric domains that are on the same compute die. However, if a unless SNC mode is enabled).

$$f_{r,compute} = \max(f_i) \text{ where } i \in \text{Compute dielet}$$

$$f_{r,HSIO} = f_j \text{ where } j \in \text{HSIO dielet (both IO can have different frequency)}$$

FIG. 10 schematically illustrates an example user interface for the multi-domain single fabric data processing apparatus according to the present technique. A user interface may be provided to enable user selection of the frequency (and in turn voltage) for each of the different fabric domains on the SoC.

There are four types of variables in the example user interface illustrated in FIG. 10:
  i. Fabric Domain Ratio Status N—shows current frequency of the fabric domain N
  ii. Fabric Domain Ratio MAX LIMIT N—Apply this limit to the frequency of fabric domain N
  iii. Fabric Domain Ratio MIN LIMIT N—Apply this limit to the frequency of fabric domain N
  iv. Fabric DVFS mode select Via this user interface, users can, for example, set the MAX LIMIT and MIN LIMIT for a given fabric domain to be the same and force the frequency of a fabric domain as per their specific requirements.

According to the present technique it is possible to obtain better power and performance optimizations with multiple V-F domains under non-homogeneous fabric traffic distribution.

Some example implementation scenarios include:
  DVFS on High Speed IO (HSIO) disaggregated tile fabric
  Multiple socket level cluster configuration
  Companion die fabric that cannot run at same frequency as main core die fabric
  Sub-NUMA (Non Uniform Memory Access) clustering mode
  Peer-peer companion fabric optimization Although there are some dual (or multi) processor systems where two (or multiple) different fabrics are connected through a bridge (path interconnect) in a single package. For example two compute sockets of the type illustrated in FIG. 3 may be connected to form a data processing apparatus. Topologically, such dual processor systems system could appear superficially to be like a single fabric partitioned into two fabric domains. However, two separate fabrics connected by a bridge are very poor in performance compared to a single large fabric. This is because, the bridge latency cannot match the native fabric latency. The performance demands of a single fabric call for mechanisms that enable the fabric PnP (Power and Performance) optimizations without affecting the baseline performance of the fabric. Examples of the present technique involve partitioning a single large fabric into multiple V/F domains without incurring any appreciable latency being attributable to the mechanisms that enable this partitioning. Example implementations can achieve zero or at least very low added latency for multiple V/F domains in a single fabric.

A simple backpressure mechanism, such as an asynchronous FIFO could in principle be used in between the fabric domains to provide loss-less data transmission when two fabric domains are operating at asymmetric frequencies. However, this will likely incur a two to three cycle latency in the data path, which is not often acceptable for a single shared fabric performance. By way of contrast a fabric backpressure mechanism according to the present technique that implements a duty cycle based on a frequency mismatch amount, does not incur impractical extra latency and thus facilitates viable implementation of fabric partitioning. Moreover, an approximation to this backpressure mechanism is provided, such that it uses minimal hardware logic while still working across a wide range of frequency mismatch between the two different fabric domains of the single fabric.

In this specification, the phrase "at least one of A or B" and the phrase "at least one of A and B" and should be interpreted to mean any one or more of the plurality of listed items A, B etc., taken jointly and severally in any and all permutations.

Where functional units have been described as circuitry, the circuitry may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function.

Circuitry may be implemented, for example, as a hardware circuit comprising processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGAs), logic gates, registers, semiconductor devices, chips, microchips, chip sets, and the like.

The processors may comprise a general purpose processor, a network processor that processes data communicated over a computer network, or other types of processor including a reduced instruction set computer RISC or a complex instruction set computer CISC. The processor may have a single or multiple core design. Multiple core processors may integrate different processor core types on the same integrated circuit die. The data processing apparatus may be or may comprise a SoC, such as a server SoC, or another type of integrated circuit.

Machine readable program instructions may be provided on a transitory medium such as a transmission medium or on a non-transitory medium such as a storage medium.

Such machine readable instructions (computer program code) may be implemented in a high level procedural or object oriented programming language. However, the program(s) may be implemented in assembly or machine language, if desired. In any case, the language may be a compiled or interpreted language, and combined with hardware implementations.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In some embodiments, one or more of the components described herein may be embodied as a System On Chip (SOC) device. A SOC may include, for example, one or more Central Processing Unit (CPU) cores, one or more Graphics Processing Unit (GPU) cores, an Input/Output interface and a memory controller. In some embodiments a SOC and its components may be provided on one or more integrated circuit die, for example, packaged into a single semiconductor device.

EXAMPLES

The following examples pertain to further embodiments.

A first example provides a single communication fabric for a data processing apparatus, the single communication fabric comprising:

an interconnection network to provide a topology of data communication channels between a plurality of data-handling functional units, the interconnection network having a first interconnection domain to provide data communication between a first subset of the data-handling functional units and a second interconnection domain to provide data communication between a second subset of the data-handling functional units; and power management circuitry to control a first performance level for the first interconnection domain independently from control of a second performance level for the second interconnection domain.

Example 2 may be the single communication fabric of example 1, or any other example herein, wherein a given performance level is characterized by at least an operating frequency and wherein the first performance level and the second performance level are set by the power management circuitry to operate at respective different operating frequencies.

Example 3 may be the integrated circuit of example 2, or any other example herein, comprising a backflow control circuitry to throttle communication of data from one of the first interconnection domain and the second interconnection domain that is set to the higher frequency of the different operating frequencies to the other of the first interconnection domain and the second interconnection domain that is set to a lower frequency of the different operating frequencies.

Example 4 may be single communication fabric of example 3 or any other example herein, wherein the backflow control circuitry performs control of data to be communicated between the first interconnection domain and the second interconnection domain depending on both a difference between the higher operating frequency and the lower operating frequency and a direction of transmission between the first interconnection domain and the second interconnection domain.

Example 5 may be the single communication fabric of example 4 or any other example herein, wherein the backflow control circuitry is to throttle communication of data to be communicated when the direction of transmission between the first and second interconnection domains is from the higher operating frequency domain to the lower operating frequency domain.

Example 6 may be the single communication fabric of example 5 or any other example herein, wherein the backflow control circuitry performs the control of data to be communicated by implementing a duty cycle such that data communication between the first and second interconnection domains is permitted for a predetermined first subset of clock cycles of the higher operating frequency within the duty cycle denoted ON cycles and data communication is stalled for clock cycles other than the first subset of the higher operating frequency within the duty cycle denoted OFF cycles.

Example 7 may be the single communication fabric of example 6 or any other example herein, wherein the interconnection network is to recirculate in the transmitting interconnection domain data that would otherwise be transmitted in the clock cycles of the duty cycle for which data communication is stalled such that data loss corresponding to stalled communication clock cycles of the duty period is prevented.

Example 8 may be the single communication fabric of example 7 or any other example herein, wherein the power management circuitry is to increase an operating frequency of the transmitting interconnection domain where appropriate to support recirculation of the stalled data for transmission to protect against the data loss.

Example 9 may be the single communication fabric of example 6 or example 7 or any other example herein, wherein the backflow control circuitry is to determine a relative proportion of ON cycles to OFF cycles in the duty cycle depending on values of both the higher operating frequency and the lower operating frequency selected by the power management circuitry.

Example 10 may be the single communication fabric of example 8 or any other example herein, wherein the backflow control circuitry is to determine a number of OFF cycles per duty cycle depending on a ratio of (ft−fr)/fr, where if the higher operating frequency at which the transmitting interconnection domain is to operate and fr is the lower operating frequency at which the receiving interconnection domain is to operate.

Example 11 may be the single communication fabric of example 9 or any other example herein, wherein the backflow control circuitry comprises throttling circuit hardware to determine the duty cycle ratio and wherein the throttling hardware comprises a shifter to approximate the duty cycle ratio.

Example 12 may be the single communication fabric of example 10 or any other example herein, wherein the throttling circuit hardware comprises an adder to receive as a first input an output of the shifter and to receive as a second input an offset value to enable compensation for clock skew between the transmitting interconnection domain and the receiving interconnection domain.

Example 13 may be single communication fabric of example 11 or any other example herein, wherein the offset value is settable to a first value to tune the throttling circuit hardware to compensate for clock skew and the offset value is settable to a second, different, value for functional correctness.

Example 14 may be the single communication fabric of any one of examples 10 to 12 or any other example herein, wherein the throttling circuit hardware comprises an enable bit to disable throttling when the receiving interconnection domain is set by the power management circuitry to operating at a frequency greater than or equal to the transmitting interconnection domain.

Example 15 may be the single communication fabric of any one of examples 1 to 14 or any other example herein, wherein the power management circuitry comprises a master power management unit to globally manage power of the interconnection network.

Example 16 may be the single communication fabric of any one of examples 1 to 15 or any other example herein, having a first dielet comprising both the first subset of the data-handling functional units and the first interconnection domain and having a second dielet having both the second subset of the plurality of the data-handling functional units and the second interconnection domain.

Example 17 may be the single communication fabric of example 16 or any other example herein, wherein the first dielet is a compute dielet, the first interconnection domain is a compute interconnection domain and wherein the second dielet is an Input/Output, I/O, dielet and the second interconnection domain is an I/O interconnection domain.

Example 18 may be the single communication fabric of example 17 or any other example herein, wherein the compute interconnection domain has a compute interconnection telemetry circuitry and wherein the I/O interconnection domain has a I/O interconnection telemetry circuitry, independent from the compute interconnection telemetry circuitry.

Example 19 may be the single communication fabric of example 18 or any other example herein, wherein the power management circuitry is to at least one of: determine a requested performance level for the compute interconnection domain depending on input from the compute interconnection telemetry circuitry; and determine a requested performance level for the I/O interconnection domain depending on input from the I/O interconnection telemetry circuitry.

Example 20 may be the single communication fabric of example 19 or any other example herein, wherein the power management circuitry is to set a target performance level for each of the different interconnection domains based on at least the respective requested performance level and one or more constraint.

Example 21 may be the single communication fabric of example 20 or any other example herein, wherein the one or more constraint comprises at least one of a minimum limit frequency and a maximum limit frequency.

Example 22 may be the single communication fabric of example 20 or any other example herein, wherein the I/O interconnection domain has a plurality of sub-domains and wherein the power management circuitry is to independently control a respective performance level of the plurality of sub-domains.

Example 23 may be the single communication fabric of any one of examples 20 to 22 or any other example herein, wherein the compute domain has a plurality of sub-domains and wherein the power management circuitry is to determine a requested performance level of each compute sub-domain.

Example 24 may be the single communication fabric of example 23 or any other example herein, wherein the compute dielet comprises a distributed last level cache and wherein the power management circuitry is to set the a target performance level of all of the compute sub-domains to a highest one of the requested performance levels.

Example 25 may be an integrated circuit comprising the single communication fabric of any one of examples 1 to 24 and the plurality of data-handling functional units.

Example 26 may be a data processing apparatus comprising the single communication fabric of example 1 or any other example herein; and the plurality of data-handling functional units; wherein the plurality of data handling functional units are provided on at least two different semiconductor dies. The processor package may be a server.

A twenty-seventh example provides machine-readable instructions for execution by hardware processing circuitry to perform power management of a single communication fabric, the single communication fabric having an interconnection network to allow a communication between a plurality of data-handling functional units, the interconnection network having a first interconnection domain to provide data communication between a first subset of the data-handling functional units and a second interconnection domain to provide data communication between a second subset of the data-handling functional units, the machine-readable instructions comprising:
  code to control a first performance level of the first interconnection domain independently from control of a second performance level of the second interconnection domain, wherein the performance level comprises at least an operating frequency.

Example 28 may be the machine-readable instructions of example 27 or any other example herein, comprising code to throttle communication of data between the first interconnection domain and the second interconnection domain depending on any difference between the first and second performance levels and depending on a direction of transmission of the data.

Example 29 may be a method of controlling power to a single communication fabric, the single communication fabric having an interconnection network to allow a communication between a plurality of data-handling functional units, the interconnection network having a first interconnection domain to provide data communication between a first subset of the data-handling functional units and a second interconnection domain to provide data communication between a second subset of the data-handling functional units, the method comprising:
controlling a first performance level for the first interconnection domain; and
controlling a second performance level for the second interconnection domain;
wherein the performance level comprises at least an operating frequency and wherein the first performance level and the second performance level can be concurrently set to respective different operating frequencies.

Example 30 may be the method of example 29 or any other example herein, comprising throttling communication of data between the first interconnection domain and the second interconnection domain depending on any difference between the first and second performance levels and depending on a direction of transmission of the data and wherein throttled data is recirculated pending transmission.

Example 31 may be a single communication fabric for a data processing apparatus, the single communication fabric comprising:
means for providing a topology of data communication channels between a plurality of data-handling functional units, the interconnection network having a first interconnection domain to provide data communication between a first subset of the data-handling functional units and a second interconnection domain to provide data communication between a second subset of the data-handling functional units; and
means for managing power to control a first performance level for the first interconnection domain independently from control of a second performance level for the second interconnection domain.

Example 32 may be single communication fabric of example 31 or any other example herein, comprising means for throttling communication of data between the first interconnection domain and the second interconnection domain depending on any difference between the first and second performance levels and depending on a direction of transmission of the data and wherein throttled data is recirculated pending transmission.

The invention claimed is:

1. A communication fabric apparatus, comprising:
an interconnection network configured to provide a topology of data communication channels between a plurality of data-handling functional units, the interconnection network having a first interconnection domain configured to provide data communication between a first subset of the data-handling functional units and a second interconnection domain configured to provide data communication between a second subset of the data-handling functional units;
power management circuitry configured to control a first performance level for the first interconnection domain independently from control of a second performance level for the second interconnection domain;
a backflow control circuitry configured to throttle data communication from one of the first interconnection domain and the second interconnection domain that is set to a higher operating frequency to the other of the first interconnection domain and the second interconnection domain that is set to a lower operating frequency; and
wherein the backflow control circuitry is configured to:
(i) control data to be communicated between the first interconnection domain and the second interconnection domain based on a difference between the higher operating frequency and the lower operating frequency,
(ii) determine a relative proportion of ON cycles to OFF cycles in a duty cycle depending on values of both the higher operating frequency and the lower operating frequency, and
(iii) throttle the data communication from one of the first interconnection domain and the second interconnection domain that is set to the higher operating frequency to the other of the first interconnection domain and the second interconnection domain that is set to the lower operating frequency, the throttling performed by permitting data communication for the ON cycles and stalling data communication for the OFF cycles.

2. The apparatus of claim 1, wherein the interconnection network is configured to recirculate, in the one of the first or second interconnection domains that is a transmitting interconnection domain, data that would otherwise be transmitted in the OFF cycles such that data loss corresponding to the stalled data communication is prevented.

3. The apparatus of claim 2, wherein the power management circuitry is configured to increase an operating frequency of the transmitting interconnection domain where appropriate to support recirculation of stalled data for transmission to protect against the data loss.

4. The apparatus of claim 3, wherein the backflow control circuitry is configured to determine a number of the OFF cycles per duty cycle depending on a ratio of $(f_t-f_r)/f_t$, wherein $f_t$ is the higher operating frequency at which the transmitting interconnection domain is to operate and $f_r$ is the lower operating frequency at which the other of the first or second interconnection domain is to operate, wherein the other of the first or second interconnection domain is a receiving interconnection domain.

5. The apparatus of claim 4, wherein the backflow control circuitry comprises a throttling circuit hardware configured to determine a duty cycle ratio and wherein the throttling circuit hardware comprises a shifter configured to approximate the duty cycle ratio.

6. The apparatus of claim 5, wherein the throttling circuit hardware comprises an adder configured to receive, as a first input, an output of the shifter and to receive, as a second input, an offset value to enable compensation for clock skew between the transmitting interconnection domain and the receiving interconnection domain.

7. The apparatus of claim 1, having a first dielet comprising both the first subset of the data-handling functional units and the first interconnection domain and having a second dielet having both the second subset of the plurality of the data-handling functional units and the second interconnection domain.

8. The apparatus of claim 7, wherein the first dielet is a compute dielet, the first interconnection domain is a compute interconnection domain and wherein the second dielet is an Input/Output (I/O) dielet and the second interconnection domain is an I/O interconnection domain.

9. The apparatus of claim 8, wherein the compute interconnection domain has a compute interconnection telemetry circuitry and wherein the I/O interconnection domain has a I/O interconnection telemetry circuitry, independent from the compute interconnection telemetry circuitry.

10. The apparatus of claim 9, wherein the power management circuitry is configured to at least one of:
   determine a requested performance level for the compute interconnection domain depending on input from the compute interconnection telemetry circuitry; and
   determine a requested performance level for the I/O interconnection domain depending on input from the I/O interconnection telemetry circuitry.

11. The apparatus of claim 10, wherein the power management circuitry is configured to set a target performance level for each interconnection domain based on at least a respective requested performance level and one or more constraints.

12. The apparatus of claim 11, wherein the one or more constraints comprise at least one of a minimum limit frequency and a maximum limit frequency.

13. The apparatus of claim 12, wherein the I/O interconnection domain has a plurality of sub-domains and wherein the power management circuitry is configured to independently control a respective performance level of the plurality of sub-domains.

14. The apparatus of claim 12, wherein the compute interconnection domain has a plurality of sub-domains and wherein the power management circuitry is configured to determine a requested performance level of each compute sub-domain.

15. The apparatus of claim 14, wherein the compute dielet comprises a distributed last level cache and wherein the power management circuitry is configured to set a target performance level of all of the compute sub-domains to a highest one of the requested performance levels.

16. A data processing apparatus comprising:
   a plurality of data-handling functional units provided on at least two different semiconductor dies;
   a communication fabric including:
      an interconnection network configured to provide a topology of data communication channels between the plurality of data-handling functional units, the interconnection network having a first interconnection domain configured to provide data communication between a first subset of the data-handling functional units and a second interconnection domain to provide data communication between a second subset of the data-handling functional units;
      power management circuitry configured to control a first performance level for the first interconnection domain independently from control of a second performance level for the second interconnection domain; and
      a backflow control circuitry configured to throttle data communication from one of the first interconnection domain and the second interconnection domain that is set to a higher operating frequency to the other of the first interconnection domain and the second interconnection domain that is set to a lower operating frequency, wherein the first and second interconnection domains are configured to recirculate data within themselves when they are stalled due to the data communication throttling.

17. The data processing apparatus of claim 16, wherein the backflow control circuitry is configured to control data to be communicated between the first interconnection domain and the second interconnection domain depending on both a difference between the higher operating frequency and the lower operating frequency and a direction of transmission between the first interconnection domain and the second interconnection domain.

18. A non-transitory machine-readable medium storing machine-readable instructions for execution by processing circuitry to perform power management of a communication fabric, the communication fabric having an interconnection network to provide communication between a plurality of data-handling functional units, the interconnection network having i) a first interconnection domain to provide data communication between a first subset of the data-handling functional units, (ii) a second interconnection domain to provide data communication between a second subset of the data-handling functional units, and (iii) backflow control circuitry configured to (a) control data communication between the first interconnection domain and the second interconnection domain based on a difference between a higher domain operating frequency and a lower domain operating frequency, (b) determine a relative proportion of ON cycles to OFF cycles in a duty cycle depending on values of both the higher domain operating frequency and the lower domain operating frequency, and (c) throttle the data communication between the first interconnection domain and the second interconnection domain by permitting data communication for the ON cycles and stalling data communication for the OFF cycles, the machine-readable instructions, when executed, configure an apparatus to:
   control a first performance level of the first interconnection domain; and
   control a second performance level of the second interconnection domain independently from the first interconnection domain;
   wherein the first and second performance levels correspond to at least a respective operating frequency.

19. The non-transitory machine-readable medium of claim 18, wherein the machine-readable instructions, when executed, further configure the apparatus to throttle communication of data between the first interconnection domain and the second interconnection domain based on a difference between the first and second performance levels and depending on a direction of transmission of the data.

* * * * *